3,129,221
4-METHYL-6-EXOMETHYLENE STEROIDS
AND PROCESSES
John Fried, Plainfield, and Anthony N. Nutile, Elizabeth,
N.J., assignors to Merck & Co., Inc., Rahway, N.J.,
a corporation of New Jersey
No Drawing. Filed June 13, 1960, Ser. No. 35,455
8 Claims. (Cl. 260—239.55)

This invention is concerned generally with novel 4-methyl-steroid compounds and with processes of making the same. More particularly, it relates to novel 4-methyl-$\Delta^4$-steroid-3-ones, 4-methyl-6-exomethylene-$\Delta^4$-steroid-3-ones and 4α-methyl-6-exomethylene-steroid-3-ones, and to the process of making such compounds, starting with a $\Delta^4$-steroid-3-one.

In accordance with the present invention, the novel 4-methyl-steroids are prepared by a process which can be represented as follows, showing the A and B rings of the steroid molecule:

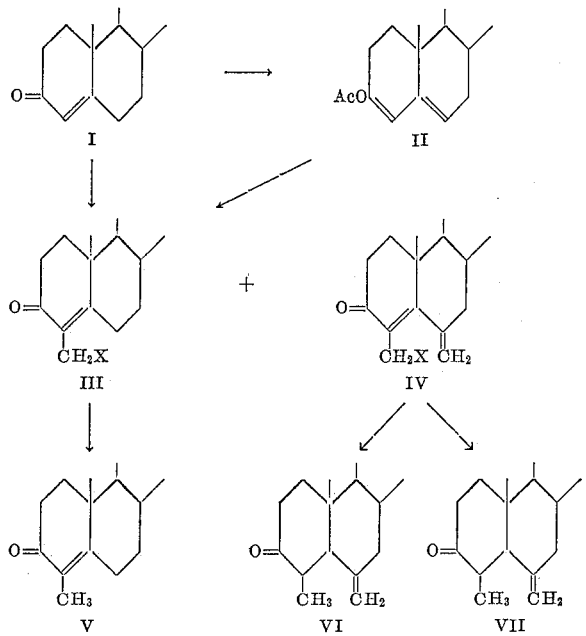

In this process a $\Delta^4$-steroid-3-one (I), in which any oxygen function present at C-17, or in a side chain attached at the C-17 position of the steroid molecule, is protected by suitable protecting groups, is converted into the 3-acetoxy-$\Delta^{3,5}$-steroid (II). Either compound (I) or (II) is then reacted with a halomethyl methyl ether in acetic acid to form a mixture of the 4-halomethyl-$\Delta^4$-steroid-3-one (III), and the 4-halomethyl-6-exomethylene-$\Delta^4$-steroid-3-one (IV). The 4-halomethyl-6-exomethylene-$\Delta^4$-steroid-3-one (IV) may be obtained from the mixture of (III) and (IV) either directly by recrystallization from a solvent such as methanol, or, after first refluxing the mixture with aqueous HCl in methanol for several hours, by chromatography over acid-washed alumina.

The 4-methyl-$\Delta^4$-steroid-3-one (V) is obtained by reacting the mixture of 4-halomethyl-$\Delta^4$-steroid-3-one (III) and 4-halomethyl-6-exomethylene-$\Delta^4$-steroid-3-one (IV), dissolved in acetic acid, with zinc dust at about 25° C. for 40–60 minutes. The 4-methyl-$\Delta^4$-steroid-3-one is separated from the reaction mixture by chromatography over acid-washed alumina and elution with mixtures of ether and petroleum ether. It is purified by crystallization.

The 4-methyl-6-exomethylene-$\Delta^4$-steroid-3-one (VI) is prepared by reduction of the 4-halomethyl-6-exomethylene-$\Delta^4$-steroid-3-one (IV) with Raney nickel. For this purpose, it is preferred to use Raney nickel which has been stored for several months, for example under ethanol.

The 4α-methyl-6-exomethylene-steroid-3-one (VII) is prepared by reduction of the 4-halomethyl-6-exomethylene-$\Delta^4$-steroid-3-one (IV) with zinc dust in acetic acid. The zinc dust is preferably added in portions over a period of 30–60 minutes. The product is separated by chromatography on acid-water alumina.

The above process of forming the novel 4-methyl-steroids is not limited to the use of any particular type of $\Delta^4$-steroid-3-one as starting material, but is an effective procedure for steroid compounds generally, and includes especially steroids of the androstane and pregnane series. However in many cases it is preferable to protect other functionality with a suitable protecting group.

When a $\Delta^4$-pregnene-17α,21-diol-3,20-dione is employed as a starting material, the preferred protecting group is the 17α,20,20,21-bis-methylenedioxy-derivatives which may be obtained by the reaction of the steroid with formalin. The $\Delta^4$-pregnene-3-ones used as starting materials include, for example, the 17α,20,20,21-bis-methylenedioxy-4-pregnene-3-ones and the 11-oxygenated 17α,20,20,21-bis-methylenedioxy-4-pregnene-3-ones, as well as the 16α-methyl and 9α-halogen derivatives thereof.

Other $\Delta^4$-steroid-3-ones which may be used as the starting material include testosterone, 17α-methyltestosterone, 20-dihydroprogesterone, and the 11-keto- and 9α-halogen-11-keto progesterone derivatives.

When the $\Delta^4$-androstene-17β-ol-3-ones are used as starting materials, the preferred protecting group is the 17-ester group. The 17-esters of the $\Delta^4$-androstene-17β-ol-3-ones can be prepared by reacting the 17β-ol-steroid with an acylating agent, e.g., an acid anhydride of the benzene series, such as benzoic acid anhydride, a lower alkanoic acid anhydride, such as acetic anhydride, propionic anhydride, butyric anhydride, and the like, or a lower alkanoyl halide. The $\Delta^4$-androstene-3-ones used as starting materials include, for example, the testosterone-17-esters such as the testosterone-17-acetate, propionate or benzoate.

The halomethyl methyl ether employed for this reaction has the structural formula $XCH_2$—O—$CH_3$ in which X may be chlorine, bromine or fluorine, but is preferably chlorine or bromine.

If the synthesis is started with a $\Delta^4$-pregnene-17α,21-diol-3,20-dione, in which the dihydroxyacetone side chain at the 17-carbon atom is first protected by the formation of the 17α,20,20,21-bis-methylenedioxy derivative, the removal of the bis-methylenedioxy function to reform the dihydroxyacetone function is accomplished by treatment with aqueous organic acids such as formic or acetic acids.

In a preferred embodiment of our invention, the 17α,20,20,21-bis-methylenedioxy-derivative is heated under nitrogen with 60% formic acid for about 15 minutes at 93–95° C. The crude product is then reacted with sodium methanol in methanol solution under nitrogen for about 5–10 minutes at 20–25° C. to hydrolyze any 21-formate present. The product is purified by treatment with activated carbon, and then crystallized to give the pure 17α,21-dihydroxy-3,20-diketo derivative.

If the synthesis is started with a $\Delta^4$-androstene-17β-ol-3-one, the 17-ester group is hydrolyzed with base, for example, sodium carbonate or potassium hydroxide in methanol.

Following the procedure set forth above, the 17α,20,20,21-bis-methylenedioxy-4-pregnene-3,11-dione is converted into 17α,20,20,21-bis-methylenedioxy-3-acetoxy-3,5-pregnadiene-11-one by refluxing with p-toluenesulfonic acid and isopropenyl acetate in dry benzene solution under nitrogen for several hours. Either the 17α,20,20,21-bis-methylenedioxy-4-pregnene-3,11-dione, or the 17α,20,20,21 - bis-methylenedioxy-3-acetoxy-3,5-pregnadiene-11-one is then allowed to stand over night at room temperature with chloromethyl methyl ether in acetic acid to form a mixture of 4-chloromethyl-17α,20,20,21-bis-methylenedioxy - 4 - pregnene - 3,11 - dione and 4-chloromethyl-6-exomethylene - 17α,20,20,21 - methylenedioxy-4-pregnene-3,11 - dione. 4 - chloromethyl-6-exomethylene-17α,20,20,21-bis-methylenedioxy-4-pregnene-3,11-dione may be obtained from this mixture either directly by recrystallization from methanol, or after refluxing with aqueous HCl in methanol for several hours, by chromatography over acid-washed alumina and elution with a mixture of ether and petroleum ether.

The 4 - methyl-17α,20,20,21-bis-methylenedioxy-4-pregnene-3,11-dione is prepared by reaction of the mixture of 4 - chloromethyl-17α,20,20,21-bis-methylenedioxy-4-pregnene-3,11-dione and 4-chloromethyl-6-exomethylene-17α,20,20,21-bis-methylenedioxy-4-pregnene - 3,11 - dione, dissolved in acetic acid, with zinc dust at about 25° C. for 40 to 60 minutes. The crude product is chromatographed over acid-washed alumina and eluted with mixtures of ether and petroleum ether. Recrystallization of the product with ethyl acetate gives the 4-methyl-17α,20,20,21-bis-methylenedioxy-4-pregnene-3,11-dione.

The 4-methyl-6-exomethylene-17α,20,20,21-bis-methylenedioxy-4-pregnene-3,11-dione is prepared by stirring for several hours at room temperature an ethanol solution of 4 - chloromethyl-6-exomethylene-17α,20,20,21-bis-methylenedioxy-4-pregnene-3,11-dione with Raney nickel which has been stored for several months under ethanol. The suspension is filtered, and the filtrate is concentrated to give 4-methyl-6-exomethylene-17α,20,20,21-bis-methylenedioxy-4-pregnene-3,11-dione, which is then purified by recrystallization from methanol.

The 4α - methyl-6-exomethylene-17α,20,20,21-bis-methylenedioxy-5α-pregnane-3,11-dione is prepared by the reduction of 4-chloromethyl-6-exomethylene-17α,20,20,21-bis-methylenedioxy-4-pregnene-3,11-dione with zinc dust in acetic acid. The crude product is recovered from the reaction mixture and chromatographed over acid-washed alumina, eluted with ether and petroleum ether and then crystallized from methanol to give 4α-methyl-6-exomethylene - 17α,20,20,21 - bis - methylenedioxy-5α-pregnane-3,11-dione.

The novel 4-methyl-, and 4-methyl-6-exomethylene-4-pregnene-3-ones possess anti-inflammatory activity, and are especially effective for the treatment of arthritis and related diseases, since they can be administered for their cortisone-like action in low dosage, thereby minimizing undesirable side effects.

A further embodiment of our invention comprises novel pharmaceutical compositions containing these 4-methyl-steroids.

The following examples illustrate methods of carrying out the present invention but it is to be understood that these examples are given for purposes of illustration and not of limitation.

*Example 1*

A solution of 4.0 g. of 17α,20,20,21-bis-methylenedioxy-4-pregnene-3,11-dione in 85 ml. of benzene is dried by azeotropic distillation. Four hundred milligrams of p-toluenesulfonic acid and 23 ml. of isopropenyl acetate are added and the mixture is refluxed under nitrogen for four hours. The reaction mixture is cooled and then poured into water and extracted with chloroform. The chloroform layer is washed with aqueous sodium bicarbonate solution, dried over sodium sulfate and concentrated in vacuo. The resultant oil is chromatographed on acid-washed alumina. Elution with 6:4 ether-petroleum ether yields 1.7 g. (a 40% yield) of 17α,20,20,21-bis-methylenedioxy-3-acetoxy-3,5-pregnadiene-11-one. Crystallization from ether affords a sample which has the following properties: M.P. 172–175° C.: $\alpha_D^{24}$ —27° (c. 0.7, CHCl$_3$);

U.V. $\lambda_{max.}^{MeOH}$ 234 m$\mu$, $\epsilon = 14{,}400$

Calculated for $C_{25}H_{32}O_7$: C, 67.55; H, 7.26. Found: C, 67.52; H, 7.22. The compound slowly evolves acetic acid on standing.

*Example 2*

A solution of 3.0 g. of 17α,20,20,21-bis-methylenedioxy-4-pregnene-3,11-dione and 30 ml. of chloromethyl methyl ether in 70 ml. of acetic acid is allowed to stand at room temperature overnight. The crude product is poured into water and extracted with chloroform. The chloroform layer is washed with aqueous sodium bicarbonate solution, dried over sodium sulfate and concentrated in vacuo. The resultant oil is absorbed on acid-washed alumina and eluated with ether to yield 1.65 g. of a crystalline mixture of 4-chloromethyl-17α,20,20,21-bis-methylenedioxy-4-pregnene-3,11-dione and 4-chloromethyl - 6 - exomethylene - 17α,20,20,21-bis-methylenedioxy-4-pregnene-3,11-dione.

*Example 3*

A solution of 15 g. of 17α,20,20,21-bis-methylenedioxy - 3 - acetoxy - 3,5 - pregnadiene-11-one, 90 ml. of chloromethyl methyl ether and 240 ml. of acetic acid is allowed to stand at 25° C. overnight. The crude product is poured into water and extracted with chloroform. The chloroform layer is washed with aqueous sodium bicarbonate solution, dried over sodium sulfate and concentrated in vacuo to give 4.46 g. of a crystalline mixture of 4-chloromethyl - 17α,20,20,21 - bis-methylenedioxy-4-pregnene - 3,11 - dione and 4-chloromethyl - 6 - exomethylene - 17α,20,20,21-bis-methylenedioxy-4-pregnene-3,11-dione. Chromatography on acid-washed alumina and elution with ether:petroleum ether 8:2, followed by repeated crystallization from methanol, gives about 1 g. of 6-exomethylene - 4 - chloromethyl - 17α,20,20,21 - bis-methylenedioxy - 4 - pregnene-3,11-dione, M.P. 193–198° C. The sample for analysis recrystallized from methanol, has the following properties: M.P. 196–200° C.: $\alpha_D^{25}$ +211° (c. 1, CHCl$_3$);

U.V. $\lambda_{max.}^{MeOH}$ 253 m$\mu$, $\epsilon = 11{,}600$; I.R. $\lambda_{max.}^{CHCl_3}$ 5.84, 5.95, 6.10, 6.20, 11.38$\mu$ Calculated for $C_{25}H_{31}O_6$Cl: C, 64.84; H, 6.75; Cl, 7.66. Found: C, 64.75; H, 6.85; Cl, 7.40.

*Example 4*

The crystalline mixture of 4-chloromethyl-17α,20,20,21-bis-methylenedioxy - 4 - pregnene - 3,11 - dione and 4-chloromethyl - 6 - exomethylene - 17α,20,20,21 - bis-methylenedioxy - 4 - pregnene-3,11-dione, prepared in Example 2 is refluxed with 5 cc. of 2.5 N aqueous HCl in 125 ml. of methanol for 2 hours. The solution is concentrated in vacuo. The crude product is poured into water and extracted with chloroform. The chloroform layer is washed with aqueous sodium bicarbonate solution, dried over sodium sulfate and concentrated in vacuo. The resultant oil is adsorbed on acid-washed alumina and eluted with ether:petroleum ether 9:1, and ether to yield 0.67 g. of 6-exomethylene-4-chloromethyl-17α,20,20,21 - bis - methylenedioxy - 4 - pregnene-3,11-dione. After crystallization from methanol, this compound decomposes at 197–199° C.

*Example 5*

The mixture of 4-chloromethyl - 17α,20,20,21 - bis-methylenedioxy - 4 - pregnene - 3,11 - dione and 4-chloromethyl-6-exomethylene - 17α,20,20,21 - bis-methylenedioxy - 4 - pregnene-3,11-dione, dissolved in 50 ml. of acetic acid, is stirred and treated with 5 g. of zinc dust. This reagent, divided into six portions, is added at 25° C. over a period of 45 minutes. The suspension is filtered to give a crude product which is chromatographed on acid-washed alumina. Elution with ether:petroleum ether 4:6 affords 180 mg. of a mixture of saturated compounds (I.R. $\lambda_{max.}^{Nujol}$ 5.90μ; U.V. no max.)

which could not be separated by further chromatography or by crystallization. Elution with ether:petroleum ether 8:2 and ether affords 565 mg. of crystalline fractions. Crystallization from ethyl acetate yields 320 mg. of 4-methyl - 17α,20,20,21 - bis-methylenedioxy - 4 - pregnene-3,11-dione, M.P. 268–282° C. A sample recrystallized from ethyl acetate has the following properties: M.P. 273–282° C.:

U.V. $\lambda_{max.}^{MeOH}$ 249 mμ, ε=14,300

Elution with chloroform yields 327 mg. of 17α,20,20,21-bis-methylenedioxy - 4 - pregnene - 3,11 - dione, M.P. 235–248° C.

A slurry of 970 mg. of 4-methyl - 17α,20,20,21 - bis-methylenedioxy - 4 - pregnene - 3,11 - dione in 97 ml. of 60% formic acid is purged six times with nitrogen and then heated at 93–95° C. for 15 minutes under nitrogen. The solution is cooled in an ice bath and then 100 ml. of water is added. About 20 gms. of sodium carbonate is added portionwise in approximately 20 minutes and the resulting precipitate is extracted with chloroform. The chloroform solution is washed acid free with saturated sodium bicarbonate solution and is then washed with water. The chloroform is removed in vacuo and the residue is flushed with 20 ml. of methanol and then concentrated in vacuo to dryness. The crude product at this point contains approximately 10–15% of the 21-formate.

The crude product is dissolved in 45 ml. of purified methanol and purged 6 times with nitrogen. After adding 1.43 ml. of 0.21 M sodium methoxide in methanol (about 12% of theory), the solution is stirred for 7 minutes at 20–25° C. under nitrogen. The solution is then acidified with 3–4 drops of acetic acid. Five ml. of water and 500 mg. of activated carbon (Darco G–60) are then added and the mixture is stirred at room temperature for 20 minutes. After filtering off the carbon, 40 ml. of water is added and the solution is concentrated in vacuo until essentially no methanol is present. The residual material is filtered again, dried and crystallized from ethyl acetate to give 4-methyl-4-pregnene - 17α,21 - diol-3,11,20-trione.

Example 6

A solution of 150 mg. of 4-chloromethyl-6-exomethylene - 17α,20,20,21 - bis-methylenedioxy-4-pregnene-3,11-dione in 30 ml. of ethanol is stirred for 2.5 hours at room temperature with about 2 g. of Raney nickel which is about 3 months old and has been stored under ethanol. The suspension is filtered and the filtrate is concentrated in vacuo. Crystallization from methanol affords 25 mg. of 4-methyl - 6 - exomethylene - 17α,20,20,21 - bis-methylenedioxy - 4 - pregnene-3,11-dione, M.P. 187–195° C. A sample for analysis, recrystallized from methanol, has the following properties: M.P. 198–203° C.: $\alpha_D^{23}$ 243 (c. 0.6 CHCl₃);

U.V. $\lambda_{max.}^{methanol}$ 258 mμ; ε 10,400; I.R. $\lambda_{max.}^{KBr}$ 5.84, 5.99, sh. 6.10, 6.21, 111.37μ

Calculated for $C_{25}H_{32}O_6$: C, 70.07; H, 7.53. Found: C, 69.36; H, 7.71. Chromatography of the mother liquors on acid-washed alumina and elution with ether:petroleum ether 8:2 affords 50 mg. of 4-methyl - 6 - exomethylene-17α,20,20,21-bis-methylenedioxy - 4 - pregnene - 3,11 - dione, M.P. 185–194° C., giving a total of 75 mg. (54% yield).

A slurry of 970 mg. of 4-methyl-6-exomethylene-17α,20,20,21-bis-methylenedioxy - 4 - pregnene - 3,11 - dione in 97 ml. of 60% formic acid is purged six times with nitrogen and then heated at 93–95° C. for 15 minutes under nitrogen. The solution is cooled in an ice bath and then 100 ml. of water is added. About 20 gms. of sodium carbonate is added portionwise in approximately 20 minutes and the resulting precipitate is extracted with chloroform. The chloroform solution is washed acid free with saturated sodium bicarbonate solution and is then washed with water. The chloroform is removed in vacuo and the residue is flushed with 20 ml. of methanol and then concentrated in vacuo to dryness. The crude product at this point contains approximately 10–15% of the 21-formate.

The crude product is dissolved in 45 ml. of purified methanol and purged 6 times with nitrogen. After adding .43 ml. of 0.21 M sodium methoxide in methanol, (about 12% of theory), the solution is stirred for 7 minutes at 20–25° C. under nitrogen. The solution is then acidified with 3–4 drops of acetic acid. Five ml. of water and 500 mg. of activated carbon (Darco G–60) are then added an dthe mixture is stirred at room temperature for 20 minutes. After filtering off the carbon, 40 ml. of water is added and the solution is concentrated in vacuo until essentially no methanol is present. The residual material is filtered again, dried and crystallized from ethyl acetate to give 4-methyl-6-exomethylene-4-pregnene-17α,21-diol-3,11,20-trione.

Example 7

A solution of 100 mg. of 4-chloromethyl-6-exomethylene-17α,20,20,21-bis-methylenedioxy - 4 - pregnene-3,11-dione in 10 ml. of acetic acid is treated with a total of 2 g. of zinc dust divided into 5 portions over a period of 45 minutes. The solution is filtered, diluted with water and extracted with chloroform. The chloroform layer is washed with aqueous sodium bicarbonate solution, dried and concentrated in vacuo. Chromatography on acid-washed alumina and elution with ether:petroleum ether 6:4 affords 52 mg. of crude 4α-methyl-6-exomethylene-17α,20,20,21 - bis-methylenedioxy - 5α - prengene - 3,11-dione, which has the following properties: M.P. 222–229° C.:

I.R. $\lambda_{max.}^{KBr}$ 5.85, 6.07, 11.08μ

Calculated for $C_{25}H_{34}O_6$: C, 69.74; H, 7.96. Found: C, 69.69; H, 8.33.

A slurry of 970 mg. of 4α-methyl-6-exomethylene-17α,20,20,21-bis-methylenedioxy-5α-pregnane - 3,11-dione in 97 ml. of 60% formic acid is purged six times with nitrogen and then heated at 93–95° C. for 15 minutes under nitrogen. The solution is cooled in an ice bath and then 100 ml. of water is added. About 20 gms. of sodium carbonate is added portionwise in approximately 20 minutes and the resulting precipitate is extracted with chloroform. The chloroform solution is washed acid free with saturated sodium bicarbonate solution and is then washed with water. The chloroform is removed in vacuo and the residue is flushed with 20 ml. of methanol and then concentrated in vacuo to dryness. The crude product at this point contains approximately 10–15% of the 21-formate.

The crude product is dissolved in 45 ml. of purified methanol and purged six times with nitrogen. After adding 1.43 ml. of 0.21 M sodium methoxide in methanol (about 12% of theory), the solution is stirred for 7 minutes at 20–25° C. under nitrogen. The solution is then acidified with 3–4 drops of acetic acid. Five ml. of water and 500 mg. of activated carbon are then added and the mixture is stirred at room temperature for 20 minutes. After filtering off the carbon, 40 ml. of water is added and the solution is concentrated in vacuo until essentially no methanol is present. The residual material is filtered again, dried and crystallized from ethyl acetate to give 4α-methyl-6-exomethylene-5α-pregnane-17α,21-diol-3,11,20-trione.

Various changes and modifications may be made in carrying out the present invention without departing from the spirit and scope thereof. Insofar as these changes and modifications are within the purview of the annexed claims, they are to be considered as part of our invention.

We claim:
1. The process for the preparation of a mixture of 4-halomethyl Δ⁴-steroid-3-one and 4-halomethyl-6-exomethylene-Δ⁴-steroid-3-one compounds of the pregnane series which comprises reacting the corresponding Δ⁴-steroid-3-one compound with halomethyl methyl ether.

2. Process for the preparation of a mixture of 4-chloromethyl-17α,20,20,21 - bis - methylenedioxy - 4-pregnene-3,11-dione and 4-chloromethyl-6-exomethylene-17α,20,20,21-bis-methylenedioxy-4-pregnene-3,11-dione, by the reaction of a compound selected from the group consisting of 17α,20,20,21-bis-methylenedioxy-4-pregnene-3,11 - dione and 17α,20,20,21 - bis - methylenedioxy-3-acetoxy - 3,5 - pregnadiene - 11-one, with chloromethyl methyl ether and acetic acid.

3. Process for the preparation of 4-chloromethyl-6-exomethylene - 17α,20,20,21 - bis - methylenedioxy-4-pregnene-3,11-dione by refluxing a mixture of 4-chloromethyl - 17α,20,20,21 - bis - methylenedioxy-4-pregnene-3,11-dione and 4-chloromethyl-6-exomethylene-17α,20,20,21-bis-methylenedioxy-4-pregnene - 3,11 - dione, with aqueous HCl methanol, and separation of the 4-chloromethyl - 6 - exomethylene - 17α,20,20,21-bismethylenedioxy-4-pregnene-3,11-dione from the reaction mixture.

4. Process for the preparation of 4-methyl-17α,20,20,21-bis-methylenedioxy-4-pregnene-3,11-dione by the reduction of a mixture of 4-chloromethyl-17α,20,20,21-bis-methylenedioxy-4-pregnene-3,11-dione and 4-chloromethyl-6-exomethylene - 17α,20,20,21-bis - methylenedioxy-4-pregnene-3,11-dione with zinc dust and acetic acid, and separation of 4-methyl-17α,20,20,21-bis-methylenedioxy-4-pregnene-3,11-dione from the reaction mixture.

5. Process for the preparation of 4-methyl-6-exomethylene-17α,20,20,21-bis-methylenedioxy-4 - pregnene-3,11-dione by the reduction of 4-chloromethyl-6-exomethylene-17α,20,20,21-bis-methylenedioxy - 4 - pregnene-3,11-dione with Raney nickel.

6. 4-chloromethyl - 17α,20,20,21 - bis - methylenedioxy-4-pregnene-3,11-dione.

7. 4-chloromethyl - 6 - exomethylene - 17α,20,20,21-bis-methylenedioxy-4-pregnene-3,11-dione.

8. 4-methyl - 6 - exomethylene - 17α,20,20,21-bis-methylenedioxy-4-pregnene-3,11-dione.

References Cited in the file of this patent

UNITED STATES PATENTS

| | | |
|---|---|---|
| 2,935,511 | Taub et al. | May 3, 1960 |
| 2,940,968 | Sletzinger et al. | June 14, 1960 |
| 2,980,711 | Colton | Apr. 18, 1961 |

OTHER REFERENCES

Klyne: Chemistry of the Steroids (1957), published by John Wiley & Sons Inc., New York, page 97.